United States Patent [19]

Seghesio

[11] 3,805,623
[45] Apr. 23, 1974

[54] BALANCING APPARATUS FOR MEASUREMENT OF WANT OF BALANCE

[75] Inventor: Jean-Louis Constant Seghesio, Paris, France

[73] Assignee: Centre National D'Etudes Spatiales, Paris, France

[22] Filed: Feb. 15, 1973

[21] Appl. No.: 332,675

[30] Foreign Application Priority Data
Feb. 18, 1972 France .............................. 72.05568
Apr. 4, 1972 France .............................. 72.11769

[52] U.S. Cl. ....................... 73/459, 73/464, 73/465, 73/472
[51] Int. Cl. ............................................. G01m 1/22
[58] Field of Search ............ 73/459, 462, 463, 464, 73/465, 471, 472

[56] References Cited
UNITED STATES PATENTS
3,605,502  9/1971  Hack .................................... 73/471
3,130,587  4/1964  Kinsey et al. ......................... 73/462

Primary Examiner—James J. Gill
Attorney, Agent, or Firm—Wigman & Cohen

[57] ABSTRACT

The balancing apparatus is designed for determining with accuracy any want of balance of a test-piece to be imparted with rotation about an axis. This test-piece is fitted on a horizontal turntable rotatable about a vertical axis, so that said axes are coextensive. The turntable is journaled on a non-rotary stand having a stationary bed-plate supporting a board subject to vibrations, through a suspension constituted by two slanting planar resilient systems forming a dihedral which is bisected by said vertical axis and whose edge extends along a horizontal line through the center of gravity of the test-piece. Two displacement sensors detect the vibrations of the board at two selected points thereof so as to sense respectively the linear movements of this board parallel to said horizontal line and its pendular movements about said horizontal line.

10 Claims, 4 Drawing Figures

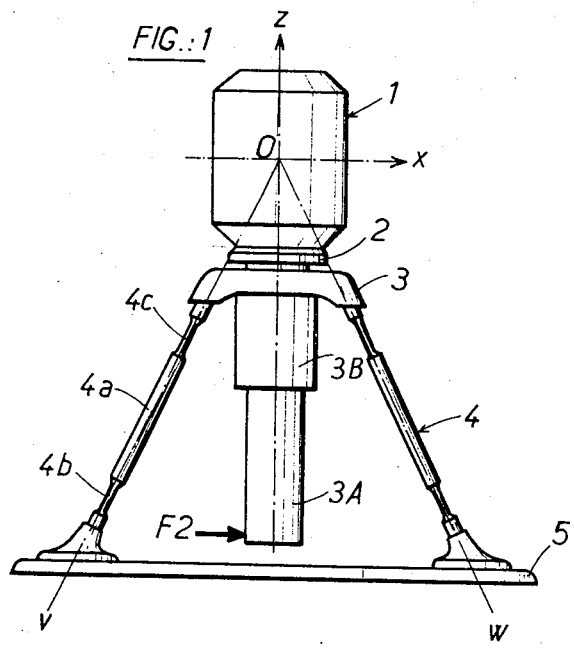
FIG.: 1
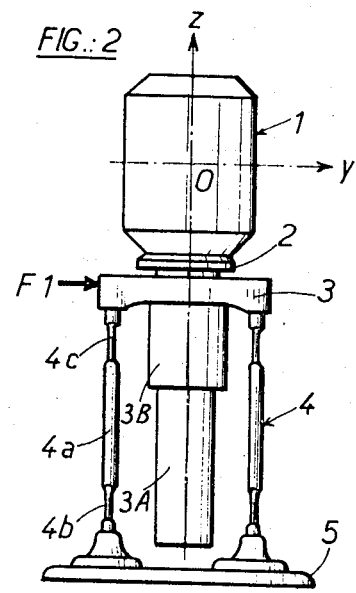
FIG.: 2

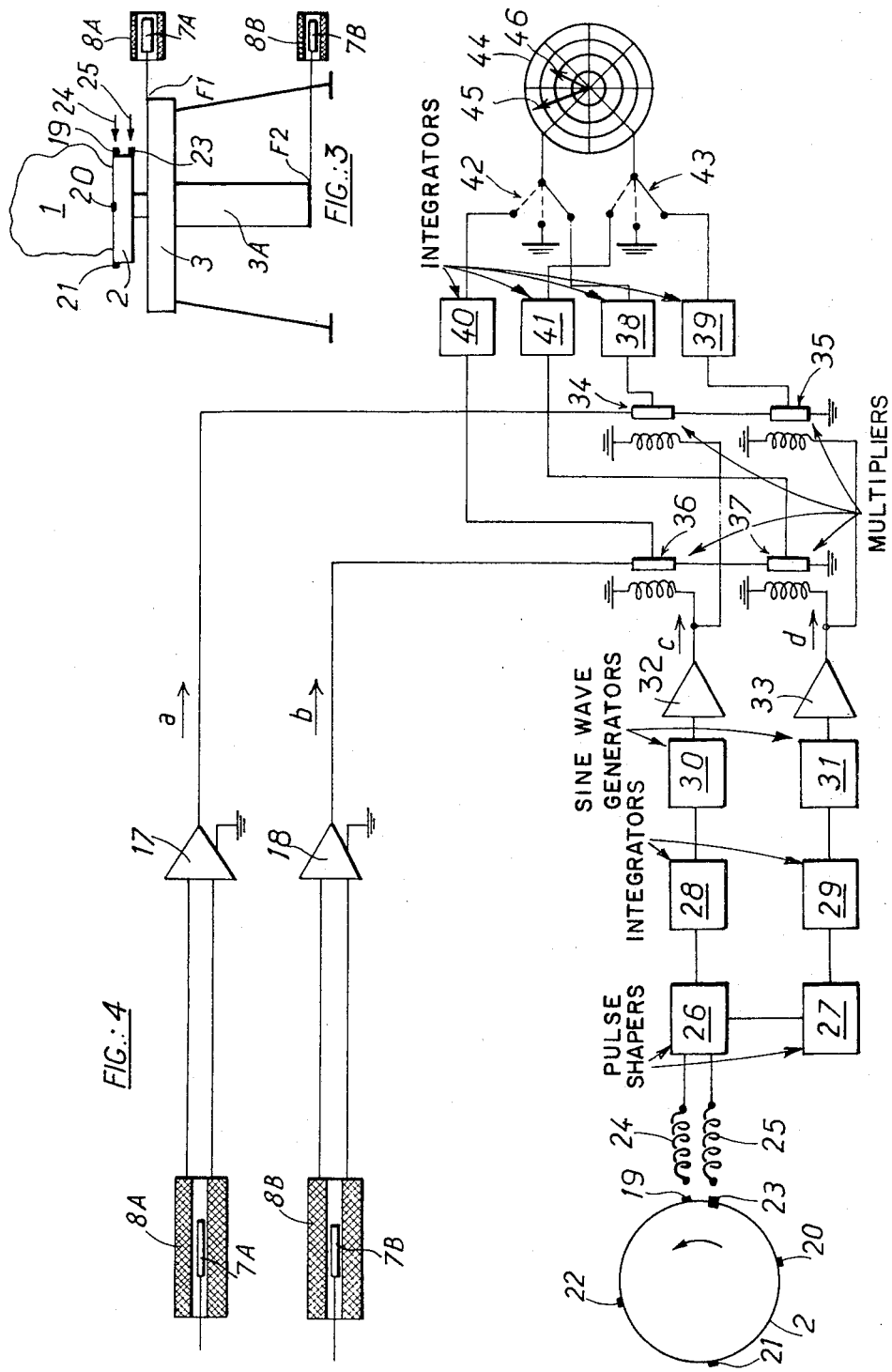

BALANCING APPARATUS FOR MEASUREMENT OF WANT OF BALANCE

The main object of the present invention is to provide an apparatus designed for determining the want of balance which may affect pieces to be subjected to rotation about an axis, e.g., a satellite, the rotor of a machine, a car wheel, a fly-wheel.

Such want of balance is due to a divergence between the actual center of gravity of the piece and its theoretical or geometric center of gravity through which the rotation axis is supposed to pass, because of a nonuniform mass distribution. In practice, two types of want of balance are recognized: on the one hand, the so-called "static" unbalance which shows up irrespective of motion and which substantiates the amount of shift of said actual C.G. with respect to said rotation axis, and on the other hand, the so-called "dynamic" unbalance which shows up during rotary motion and which substantiates the amount of shift of said actual C.G. with respect to a plane orthogonal to said rotation axis and through said geometric C.G.

The determination of the static and dynamic unbalances, through knowledge it gives of the mass distribution within the rotary body, permits balancing, i.e., checking these unbalances, by addition of small corrective masses at properly selected locations of this body, the object being to eliminate vibrations occurring during rotation and efforts exerted on bearings, which constitute one of the most important factors of wear.

In this sort of measurement, precision is known to be proportional to the square of rotation speed and that is why it is fully advantageous to operate at maximum admissible speed in order that the unbalances appear most conspicuously. However there are delicate bodies which risk deformation under centrifugal forces and cannot therefore be rotated at high speeds.

Such is the case notably of satellites and other space craft whose structure is inconsistent with operation of conventional balancing apparatus, the precision of which requires a speed above about 80 r.p.m., which is prohibitive for a satellite structure which is designed for an orbital spin of the order of 1 r.p.m. Furthermore, the most precise balancing apparatus known to-date are horizontal-axis machines which, for this reason, are improper for the handling of such a structure: the latter cannot indeed be fixed otherwise than by its interface flange provided for the booster rocket, and would therefore have to be tipped to horizontal position where important deformations due to gravity may occur.

Since a satellite requires a highly accurate balance in order to avoid any precession detrimental to the training of the craft on its orbit and likely to exhaust prematurely the stock of stabilizing gas on board experts have been faced with acute test problems for the measurement and correction of unbalances prior to launching such craft which are meant to undergo a rotation about their geometric axis of symmetry.

The present invention which offers a solution to these problems, allows the inertia parameters of the test-piece and more particularly its static and dynamic unbalances to be pinpointed, and thus its balancing to be perfected by bringing the central inertia axis back to coincidence with the rotation axis; this is carried out from response in vibrations of a mechanical system excited by dynamic forces proportional to the parameters to be measured, said test-piece being imparted with movement about a vertical axis of rotation, which may go down to a speed of as low as 15 r.p.m. or even less, while retaining a high degree of precision for the measurement.

To these requirements relative to low-speed rotation on a vertical-axis rotary apparatus, a further one should be added: minimization of the number of manipulations of satellites which are delicate appliances to which it is difficult to fit balancing masses.

The present invention also meets this further requirements by doing without the calibrations which are unavoidable with the prior art apparatus: the static and dynamic unbalances are effectively discriminated from each other thanks to a mechanical uncoupling, and they are separately displayed by direct reading, each of them exciting only one of the degrees of freedom of the vibrating system. This uncoupling has the additional advantage of simplifying the measurement network: discrimination of unbalances being available from the start, it is no longer necessary to process the signals in order to perform such discrimination, and precision is thereby enhanced.

While the present invention is of particular interest in the balancing of satellites and other space craft, it is not limited to such use and it may be applied to any other structure designed to undergo rotation about an axis, e.g., rotors of rotary machines or wheels of cars.

Other objects and advantages of the present invention will become apparent in the ensuing description given with reference to the accompanying drawings in which:

FIGS. 1 and 2 are front and side elevation views of a balancing apparatus according to the present invention.

FIG. 3 is a very schematic elevation view of this balancing apparatus from which measurement and reference signals are transmitted.

FIG. 4 is a wiring diagram for the processing of these signals.

Referring to FIGS. 1 and 2, the test-piece to be balanced is shown at 1 with its theoretical or geometric center at 0, and it is fixed to a horizontal turntable 2 rotating about a vertical axis $Oz$ on a stand constituted by a board 3 suspended on four inclined bending struts 4 set in a stationary bed-plate 5 and each comprising an intermediate rigid section 4a connected through resilient end sections 4b and 4c to the stationary bed-plate 5 and to the board 3 respectively.

The bending struts 4 are parallel two by two and positioned in two slanting planes $Ov$ and $Ow$ forming a dihedral whose angle $vOw$ is bisected by the axis $Oz$ and whose edge extends along a horizontal straight line $Oy$. It is to be noted that each bending strut of one of the planes of dihedral $vOw$ is located opposite to and in the same vertical plane as a bending strut of reverse inclination of the other plane of this dihedral; in other words, the four bending struts 4 extend along the edges of a right prism with bases in the form of an isoceles triangle (see FIG. 1) and with rectangular sides (see FIG. 2), the apex edge $Oy$ of this prism being horizontal and the bases $vOw$ vertical. This arrangement of the bending struts has the effect of restricting vibrations of board 3 to just 2° of freedom: more specifically the latter is only capable of linear displacements parallel to the apex edge of dihedral $vOw$, i.e., to horizontal axis $0y$, and of pendular displacements in the vertical plane $x0z$ about this same horizontal axis $0y$.

The vibrations of board 3 occur at a frequency equal to the rotation speed of the test-piece 1 fixed to the turntable 2. They split up into:

1. lateral vibrations parallel to axis $0y$ caused by the resultant of the torque of the dynamic forces, representative of the static unbalance,
2. pendular vibrations about axis $0y$ caused by the resulting moment representative of the dynamic unbalance.

It will therefore be sufficient to measure the amplitude of such vibrations by means of two displacement sensors properly fitted at 90° to each other at adequately selected locations indicated by F1 on FIG. 2 for the "static" sensor and by F2 on FIG. 1 for the "dynamic" sensor.

Of course, in order to increase sensitivity and accuracy of the measurement, it is advisable to take advantage of the largest possible leverage and detect these vibrations at the location of their maximum amplitudes. As far as the linear movements of board 3 parallel to $0y$ are concerned, the proper location will be as high as possible above stationary bed-plate 5 in which the lower ends of the bending struts 4 are set, as shown by arrow F1 (FIG. 2). Conversely, as for the pendular movements of board 3 about axis $0y$, the proper location will be as remote as possible therefrom, as shown by arrow F2 (FIG. 1), close to the bottom of an extension 3A of the casing 3B of an integrated electric motor for driving turntable 2.

The position and intensity of the unbalances of test-piece 1 will thus be given by measuring the phase and amplitude of the vibrations, with the aid of the two displacement sensors fitted at F1 (for the static unbalance) and at F2 (for the dynamic unbalance).

Convenient displacement sensors are available on the market, but preference is given to a known model with differential transformer, having incorporated therein a modulator-demodulator.

For the relevant measurement of unbalances, use will therefore be had of two displacement sensors 8A and 8B (see FIG. 3) having their plungers 7A and 7B respectively connected by feelers to emplacements F1 and F2 of the apparatus. These precision transducers convert displacement of the plungers 7A and 7B due to vibrations of board 3, into electric measurement signals proportional to the amplitude of the vibrations and of same frequency as these.

These measurement signals are processed in the electronic wiring diagram illustrated on FIG. 4, which allows simultaneous treatment of both measurement signals delivered by the sensors 8A and 8B fitted at F1 and F2 and which operates in conjunction with an adequate system of angular acquisition of turntable 2.

These sensors deliver, after amplification at 17 and 18, measurement signals $a$ and $b$ which are proportional to the displacements of the respective plungers 7A and 7B.

The turntable 2 carries on a same circle four equidistant metal studs 19, 20, 21, 22 and, at a different level, a fifth stud 23. Upon rotation of turntable 2, studs 19, 20, 21, 22 move past a stationary magnetic sensor 24 which delivers a pulse at each passage of a stud, while stud 23 moves likewise past another stationary magnetic sensor 25 which therefore delivers one pulse per revolution of turntable 2.

The pulses thus generated by magnetic sensors 24 and 25 are shaped at 26 and 27 so as to obtain two trains of square pulses in quadrature. After integration at 28 and 29, each pulse train passes through a sine wave generator 30 and 31 with polarized diode scales. Thus, after amplification at 32 and 33, two reference sinusoidal voltages $c$ and $d$ in quadrature, of constant amplitude, at the rotation frequency of turntable 2, are available. The pulse supplied by magnetic sensor 25 defines the 0°–90° quadrant, assuming that stud 19 represents the origin of phases, and allows acquisition of the sinusoidal signals with respect to this quadrant.

The measurement signals $a$ and $b$ are simultaneously and respectively multiplied by the reference sinusoidal voltages $c$ and $d$ in four Hall-effect cells: a cell 34 for signals $a$ and $c$, a cell 35 for signals $a$ and $d$, a cell 36 for signals $b$ and $c$, and a cell 37 for signals $b$ and $d$. In each cell, induction is rendered proportional to the reference signal $c$ or $d$, and current to the measuring signal $a$ or $b$, depending on the case.

The signals issuing from multiplier cells 34, 35, 36, 37 are integrated at 38, 39, 40, 41, this integration allowing furthermore elimination of stray signals and background noise which soil the measurement signals $a$ and $b$. Through high-frequency electronic switching at 42, 43, the two direct voltages corresponding to the quadrature components of the parameters detected by 8A and 8B, are composed on an oscilloscope 44 provided with polar diagram spider-lines: reading is thus directly made of the phase and amplitude of the corresponding parameters which show up simultaneously on the spider-lines, as schematized at 45 and 46.

The wiring diagram which has just been described presents two noteworthy advantages:

it does without a conventional measurement network effecting electric discrimination of the unbalances, it does not require carrying out calibration for each specimen.

Manipulation is thereby simplified to a maximum: it suffices indeed to read directly at 45 and 46 the values of the unbalances of mass 1 from the indications of sensors 8A and 8B.

I claim:

1. Balancing apparatus for determining the want of balance of a piece designed to be imparted with movement about a rotation axis, comprising the combination of:

a horizontal turntable driven in rotation about a vertical axis and designed for carrying said piece so that said axes are substantially coextensive, a non-rotatable stand on which said turntable is journaled and which includes: a stationary bed-plate, a vibratory board, and a suspension device interposed between said bed-plate and said board, said suspension device comprising two oppositely slanting planar resilient systems forming a dihedral which is bisected by said vertical axis and whose edge extends along a horizontal straight line through the designed center of gravity of said piece, and two displacement sensors each comprising a stationary casing and a movable feeler cooperating therewith and connected to said vibratory board to detect vibrations thereof, said sensors having their feelers fitted to two different locations of said vibratory board selected so that they detect respectively linear movements of said board parallel to said horizontal straight line and pendular movements thereof about the same line.

2. Apparatus as claimed in claim 1, wherein each of said oppositely slanting planar resilient systems comprises two inclined bending struts, each bending strut belonging to one of said systems being positioned opposite to and in a same vertical plane as a bending strut of reverse inclination belonging to the other of said systems, whereby the four bending struts of said suspension device extend generally along the edges of a right triangular prism with rectangular sides.

3. Apparatus as claimed in claim 2, wherein each of said bending struts comprises an intermediate rigid section, and two end flexible extensions thereof which constitute bending springs and which are respectively connected to said stationary bed-plate and to said vibratory board.

4. Apparatus as claimed in claim 1, wherein said displacement sensors are orthogonal to each other, and said two different locations of said vibratory board are selected respectively as close as practically possible to said horizontal straight line in the case of the sensor whose feeler detects linear movements parallel to said line, and as remote as practically possible from said horizontal straight line in the case of the other sensor whose feeler detects pendular movements about said line.

5. Apparatus as claimed in claim 4, wherein the former-mentioned displacement sensor is positioned at an elevated location of said vibratory board, whereas the latter-mentioned displacement sensor is positioned at a depressed location of said vibratory board.

6. Apparatus as claimed in claim 1, wherein each of said two displacement sensors is a transducer adapted to convert movements of said feeler thereof into an electric measurement signal of same frequency as and proportional to the amplitude of said movements, said sensors thereby delivering two separate and respective measurement signals, said apparatus further comprising an acquisition system piloted by the rotation of said turntable and designed for generating two reference sinusoidal voltages of same amplitude but in quadrature, and electronic circuit for processing in conjunction said two measurement signals and said two reference voltages, and an oscilloscope controlled by said electronic circuit and displaying simultaneously the phase and amplitude of each of said measurement signals.

7. Apparatus as claimed in claim 6, wherein said electronic circuit comprises four multipliers with two inputs and one output for each, one of said two measurements signals and one of said two reference voltages being respectively applied to the two inputs of a first multiplier, said one of said two measurement signals and the other of said two reference voltages being respectively applied to the two inputs of a second multiplier, the other of said two measurement signals and said one of said two reference voltages being respectively applied to the two inputs of a third multiplier, and said other of said two measurement signals and said other of said two reference voltages being respectively applied to the two inputs of a fourth multiplier, whereby said two measurement signals are simultaneously and respectively multiplied to said two reference voltages, four separate multiplication signals being available at the respective output of said four multipliers.

8. Apparatus as claimed in claim 7, wherein said electronic circuit further comprises four integrators respectively connected to the output of said four multipliers to integrate said multiplication signals, and a high-frequency electronic switch interposed between said four integrators and said oscilloscope to distribute thereto the output signals of said integrators.

9. Apparatus as claimed in claim 8, wherein said acquisition system comprises a pulse generator under the control of said turntable and delivering timed pulses substantiating the r.p.m. thereof, pulse shaper means to which said timed pulses are applied and delivering two trains of square pulses in quadrature, two integrators to which said pulse trains are respectively applied, and two sine-wave generators respectively connected to the output of said integrators and delivering said two reference sinusoidal voltages.

10. Apparatus as claimed in claim 6, wherein said acquisition system comprises a pulse generator under the control of said turntable and delivering timed pulses substantiating the r.p.m. thereof, pulse shaper means to which said timed pulses are applied and delivering two trains of square pulses in quadrature, two integrators to which said pulse trains are respectively applied, and two sine-wave generators respectively connected to the output of said integrators and delivering said two reference sinusoidal voltages.

* * * * *